No. 12,612. REISSUED FEB. 19, 1907.

L. W. MARSHALL.

NOTCH CUTTING MACHINE.

APPLICATION FILED JAN. 7, 1907.

3 SHEETS—SHEET 1.

Witnesses:
M. E. Flaherty
M. V. Foley

Inventor:
Levi Washington Marshall
by his attys
Charles Raymond & Evans

THE NORRIS PETERS CO., WASHINGTON, D. C.

No. 12,612. REISSUED FEB. 19, 1907.

L. W. MARSHALL.

NOTCH CUTTING MACHINE.

APPLICATION FILED JAN. 7, 1907.

3 SHEETS—SHEET 2.

Witnesses:
M. E. Flaherty
M V Foley

Inventor:
Lewis Winfield Marshall
by his attys
Charles Raymond & Co.

THE NORRIS PETERS CO., WASHINGTON, D. C.

No. 12,612. REISSUED FEB. 19, 1907.
L. W. MARSHALL.
NOTCH CUTTING MACHINE.
APPLICATION FILED JAN. 7, 1907.
3 SHEETS—SHEET 3.
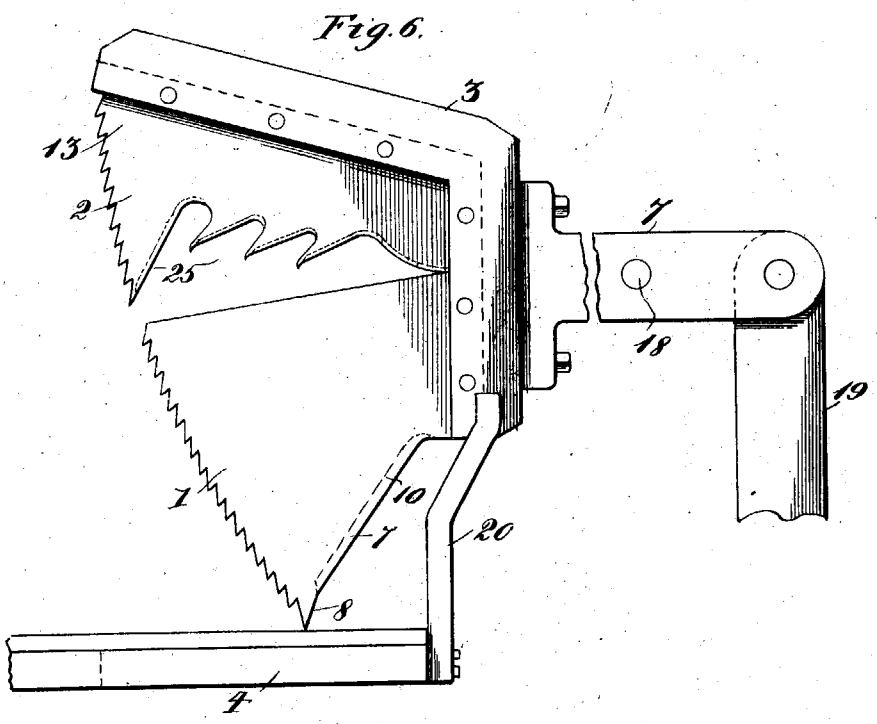
Witnesses:
M. E. Flaherty
M. V. Foley
Inventor:
Levi Winfield Marshall
by his attys
Charles Raymond & Son
THE NORRIS PETERS CO., WASHINGTON, D. C.

UNITED STATES PATENT OFFICE.

LEVI WINFIELD MARSHALL, OF WAKEFIELD, MASSACHUSETTS, ASSIGNOR TO WARNER V. TAYLOR, OF WAKEFIELD, MASSACHUSETTS.

NOTCH-CUTTING MACHINE.

No. 12,612. Specification of Reissued Letters Patent. Reissued Feb. 19, 1907.

Original No. 831,883, dated September 25, 1906. Application for reissue filed January 7, 1907. Serial No. 351,287.

*To all whom it may concern:*

Be it known that I, LEVI WINFIELD MARSHALL, a citizen of the United States, residing at Wakefield, in the State of Massachusetts, have invented new and useful Improvements in Notch-Cutting Machines, of which the following is a specification.

My invention relates to notch-cutting devices or machines, and more particularly to such ast are intended to cut a plurality of tapering notches in the opposite ends of the blanks from which so-called "single-stave" barrels are formed, whereby said blanks may be shaped into barrels having the usual tapering ends.

In the embodiment of my invention which is herein selected for illustration and which is shown in the accompanying drawings, the device comprises two principal elements—a preliminary cutter-blade and a secondary cutting member. The preliminary cutter-blade is designed to make a preliminary or entering cut in the blank near its edge, which is afterward enlarged and shaped or tapered to the required form and finally trimmed by the secondary cutter.

Figure 2:
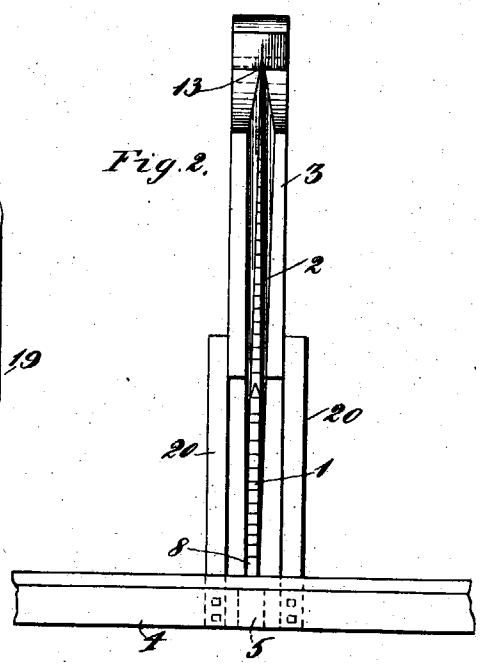
Figure 5:
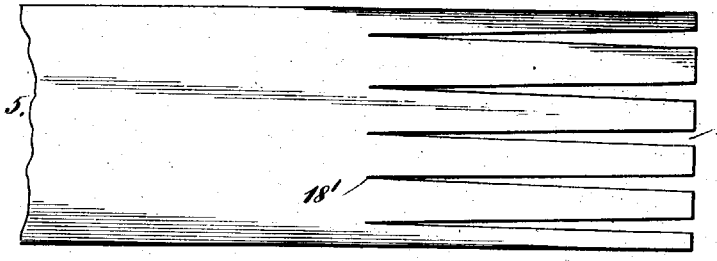
Figure 1:
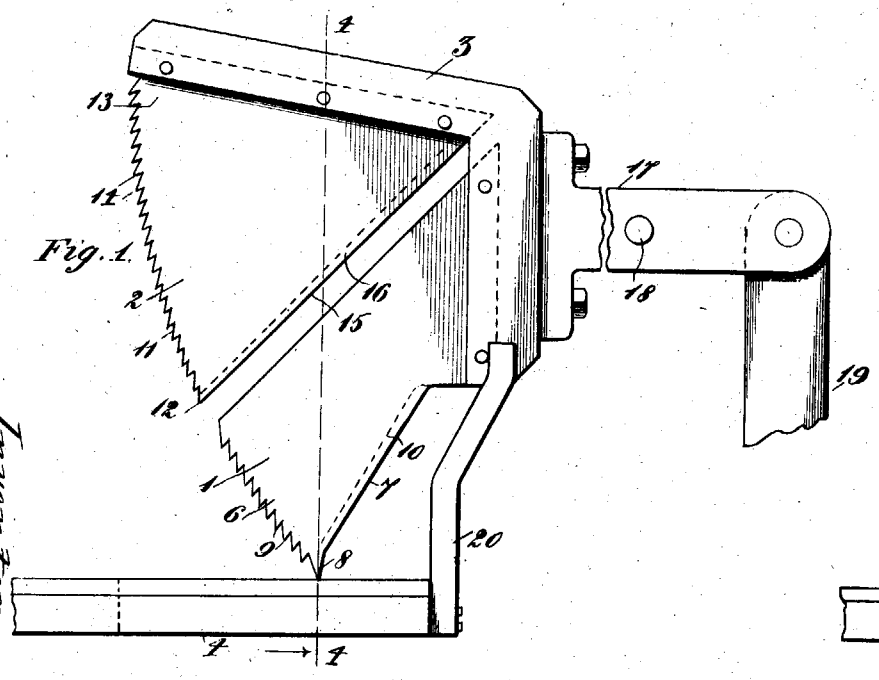
Figure 4:
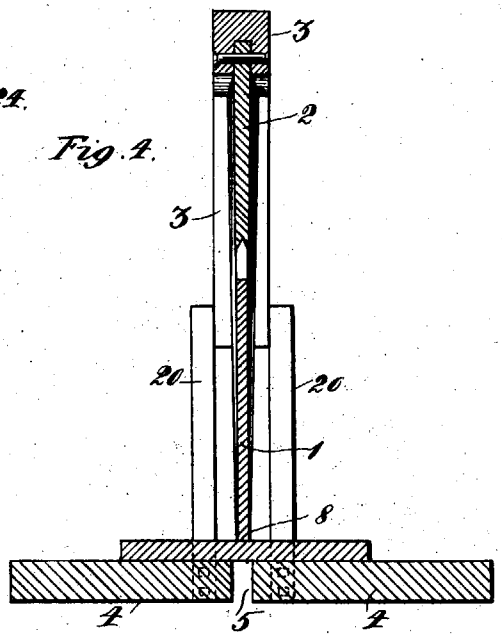
Figure 3:
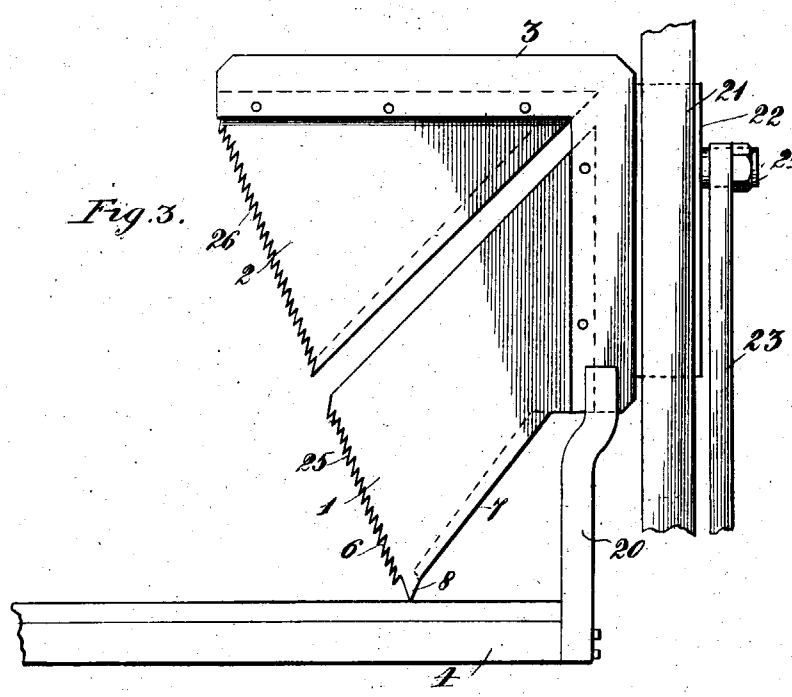

In the drawings, Figure 1 shows the preferred embodiment of my invention, in which the preliminary cutter and secondary cutter member are mounted together in a frame which may be oscillated about a fixed point or driven rectilineally. Fig. 2 is a front edge view of Fig. 1. Fig. 3 is a view similar to Fig. 1, in which the two cutters are mounted to move rectilineally. Fig. 4 is a vertical sectional view on the line 4 4, Fig. 1; and Fig. 5 is a view of one end of a blank, showing the notches. Fig. 6 is a view showing a modified form of secondary cutter.

In the embodiment of my invention herein selected for illustration and shown in Figs. 1, 2, and 4 the device consists of a part 1, which I designate as a "preliminary cutter-blade" and which forms a preliminary or entering cut near the edge of the blank, which cut is afterward enlarged and shaped by the secondary cutter 2. The secondary cutter is mounted, together with the preliminary cutter-blade, in a suitable frame 3 and immediately follows the preliminary cutter on the cutting stroke to deepen, shape, and trim the kerf to the required form and smoothness.

Below the preliminary and secondary cutters is located a work-table provided with an opening or die 5, within which the two cutters descend on the cutting stroke and which tapers from the edge of the table to the rear to conform to the shape of the notch and so support the blank along the edge of the cut as to prevent splintering the material. The preliminary cutter-blade, as will be seen from Figs. 1 and 4, is of uniform width along the front edge 6 and rear edge 7 and throughout all of that portion which enters the material, whereby in cutting out the material it forms a preliminary notch of uniform width. Said blade, however, is considerably thicker at its rear to afford strength and rigidity to the cutting portion. The bottom of the preliminary cutter is provided with an entering point or blade 8, which terminates, preferably, in a transverse edge but may be pointed, if desired. The transverse edge, however, serves to make a clean cut transversely of the fiber of the material and obviates danger of splitting. The forward edge of the preliminary cutter is provided with saw-teeth 9, which extend the cut still deeper into the material than the entering-point 8, and at the rear edge is grooved at 10 to form parallel cutting and trimming edges.

Above the preliminary cutter-blade 1 is located the secondary cutter 2, the forward edge 11 of which at the point 12 adjacent the preliminary cutter 1 is of the same width as the latter and gradually tapers upwardly to a thin edge, as at 13, whereby the notch is gradually tapered to the narrowest practicable width, so that when the walls of the notch are pressed together in the shaping of the barrel the inner end of the notch will form a perfectly tight joint, and this feature is particularly desirable in barrels intended to contain liquids.

The forward edge of the secondary cutter 2, like that of the preliminary cutter, is provided with saw-teeth 14, which serve to cut out the material beyond the point reached by the lower portion 12 of said secondary cutter. The rear edge 15 of the secondary cutter is grooved, as shown at 16, to form cutting and trimming edges. These edges, however, owing to the fact that said cutter gradually widens from the front edge to the rear, diverge, and therefore are adapted to trim out and widen the preliminary notch formed by the preliminary cutter 1, and the secondary cutter is so shaped that the completed notch will be tapered uniformly from the widest portion at the edge of the blank to its inner end. The secondary cutter is strengthened and stiffened by being made gradually thicker toward the rear, which feature also provides for the gradual divergence to the rear of the trimming-blades at the rear edge 15.

It is to be understood that the preliminary cutter-blade 1 is at all points, except at its forward edge, of less width than the rear edge 15 of the secondary cutters 2, so that all danger of splitting the material by wedging action is obviated.

To operate the cutters, the frame 3 is provided with a rearwardly-extended actuating-arm 17, (here shown as broken away to save space in illustration,) to which is pivoted at 18 a suitable support (not shown) and may be actuated by a pitman 19. The pivot-point 18 is located with reference to the arcs of the cutting edges 6 and 11 of the cutters 1 and 2 at a distance to cause the point 13 of the secondary cutter to cut the kerf to the required depth.

To direct the cutter accurately during the cutting stroke, guideways 20 are preferably provided which may be bolted to the rear edge of the cutting-table 4 or otherwise suitably mounted. These guideways also form convenient stops for the positioning of the blank to be cut.

In Fig. 3 I have shown cutters so mounted as to be moved rectilineally on the cutting stroke, and to this end additional guideways 21 are provided to receive a rib 22 on the rear of the frame 3, to which rib the operating-pitman 23 may be attached by a pivot-pin 24. The forward edges 25 and 26 of the respective cutters in this form of the device may, if desired, be formed on a right line; but in other respects these parts are similar to those heretofore described.

In Fig. 6 is shown a secondary cutter having a rear cutting and trimming edge of modified form. In this form of the device the front edge of the preliminary cutter-blade is somewhat longer than that heretofore shown, and the cutting - blade is correspondingly shortened. The main difference, however, resides in the outline of the rear cutting and trimming edges of the secondary cutter. These, instead of being straight, may have a sinuous or irregular outline and rise abruptly at 25 from the lower front portion to form cutting edges having more pronounced shearing action, while the rear portions of the edges are projected into more or less abrupt points or teeth or, it may be, in sinuous lines. The points or irregularities resulting from these outlines engage the material substantially simultaneously at different points, and this further obviates the danger of splitting the material which might result from a too abrupt engagement therewith of practically the entire lengths of the cutting edges at one time The points and indentures of these irregularities are so relatively positioned that the completed cut of the one is uniformly extended by that following, so that the kerf is uniformly and smoothly cut throughout.

The notch is cut almost instantaneously or with a single stroke and does not require feeding as to a rotary cutter or saw. The sides of the notch are finished by long keen blades, acting almost in the direction of the fibers of the wood, slightly diagonal to them and not against the ends of the fibers, as in the case of a rotary saw. In action the forces of the cutters are so distributed that they nearly balance one another, doing away with any tendency to buckle or throw the wood away from the cutters, also any tend- wood away from the cutters, also any tend- ency to feed too fast or draw the material toward the cutters. The pointed end of the notch has a more perfect taper than one cut with a rotary saw, since a saw, being of necessity very thin in order to make a fine cut and rotating rapidly, has more or less vibration or side motion. While my secondary cutter is very thin at point 13, it is yet perfectly rigid, since the metal increases in thickness in all directions from it and since it passes through the blank but once and not many times, as does a rotary saw.

It is to be understood that my invention is not limited to the embodiment here shown, but may be otherwise embodied without departing from the spirit and scope of the invention.

I claim—

1. A notch cutting and trimming machine, comprising a preliminary cutter-blade having means adapted and arranged to penetrate the surface of the work back from the edge thereof and to cut through said edge respectively, and a secondary cutter having means to further shape and trim said notch.

2. A notch cutting and trimming machine, comprising a preliminary cutter-blade having means adapted and arranged to penetrate the surface of the work back from the edge thereof and to cut to said edge respectively and a secondary cutter in the same plane as and following the preliminary cutter and having means to further shape and trim said notch.

3. A notch cutting and trimming machine comprising a preliminary cutter-blade having means adapted to penetrate the surface of the work back from the edge thereof, cutting edges running back from said means and a saw-toothed edge forward of said means, and a secondary cutter having means to further shape and trim said notch.

4. A notch cutting and trimming machine comprising a preliminary cutter-blade having means adapted and arranged to penetrate the surface of the work back from the edge thereof and means to cut back from said penetrating means and to the edge of the work respectively, and a secondary cutter having means to further shape and trim said notch.

5. A notch cutting and trimming machine comprising a preliminary cutter-blade having means adapted and arranged to penetrate the surface of the work back from the edge thereof and to cut to said edge respectively, and a secondary cutter having a forward saw-toothed cutting edge and rear cutting edges to further shape and trim said notch.

6. A notch cutting and trimming machine comprising a preliminary cutter-blade having means adapted and arranged to penetrate the surface of the work back from the edge thereof and to cut to said edge respectively, and a secondary cutter having a forward tapering cutting edge and rear cutting edges to further shape and trim said notch.

7. A notch cutting and trimming machine comprising a preliminary cutter-blade having means adapted and arranged to penetrate the surface of the work back from the edge thereof and to cut to said edge respectively, and a secondary cutter having a forward cutting edge and rear divergent cutting edges to further shape and trim said notch.

8. A notch-cutting machine comprising a preliminary cutter-blade of substantially uniform thickness throughout and having means to penetrate the work back from the edge thereof and a secondary cutter having a forward cutting edge and rear cutting edges which adjacent said forward edge are spaced apart a distance equal to the thickness of said preliminary cutter-blade and which diverge rearwardly to trim and shape said notch.

9. A notch cutting and trimming machine comprising a preliminary cutter-blade having means adapted to penetrate the surface of the work back from the edge thereof and cutting means extending back from and forward of said penetrating means.

10. A notch cutting and trimming machine, comprising a preliminary cutter-blade having means adapted to penetrate the surface of the work back from the edge thereof, cutting edges running back from said means and a saw-toothed edge forward of said means.

11. A notch cutting and trimming machine, comprising a preliminary cutter-blade having a sharp penetrating-point adapted and arranged to penetrate the surface of the work back from the edge thereof and having cutting edges running back from said point on opposite sides thereof and a secondary cutter in the same plane as and following the preliminary cutter and having edges to further shape and trim said notch.

12. A notch-cutting blade having means adapted and arranged to penetrate the surface of the work away from the edge thereof, a saw-toothed edge forward of said means, and double cutting edges separated from one another, extending backward from said means.

13. A notch-cutting blade having means adapted and arranged to penetrate the surface of the work away from the edge thereof, a gradually-tapering cutting edge forward of said means, and double cutting, spaced edges extending backward therefrom.

14. A notch-cutting blade having means adapted and arranged to penetrate the surface of the work away from the edge thereof, a gradually-tapering cutting edge extending forward from said means, and toothed, cutting edges extending backward therefrom, said toothed edges being adapted to smoothly cut the adjacent sides of the notch.

15. A notch-cutting blade arranged to first penetrate the surface of the work back from the edge thereof with double cutting edges separated from one another and operating with a shearing action, whereby they may both cut and trim the adjacent sides of the notch.

16. A notch-cutting blade arranged to first penetrate the surface of the work back from the edge thereof with double cutting, toothed or sinuous edges separated from one another and operating with a shearing action, whereby they may both cut and trim the adjacent sides of the notch.

LEVI WINFIELD MARSHALL.

Witnesses:
JOHN E. R. HAYES,
MARTIN V. FOLEY.